US012561835B2

(12) United States Patent
Plowman et al.

(10) Patent No.: US 12,561,835 B2
(45) Date of Patent: Feb. 24, 2026

(54) METHOD AND SYSTEM FOR CALCULATING VEHICLE TRAILER ANGLE

(71) Applicant: Continental Autonomous Mobility Germany GmbH, Ingolstadt (DE)

(72) Inventors: Robin Plowman, Southwick (GB); Alexander Kadyrov, Eastbourne (GB)

( * ) Notice: Subject to any disclaimer, the term of this patent is extended or adjusted under 35 U.S.C. 154(b) by 407 days.

(21) Appl. No.: 17/907,691

(22) PCT Filed: Dec. 1, 2020

(86) PCT No.: PCT/EP2020/084112
§ 371 (c)(1),
(2) Date: Sep. 29, 2022

(87) PCT Pub. No.: WO2021/197652
PCT Pub. Date: Oct. 7, 2021

(65) Prior Publication Data
US 2023/0134205 A1　May 4, 2023

(30) Foreign Application Priority Data
Mar. 31, 2020　(EP) ..................................... 20167183

(51) Int. Cl.
*G06T 7/73* (2017.01)
*G06T 7/60* (2017.01)
(52) U.S. Cl.
CPC .................. *G06T 7/74* (2017.01); *G06T 7/60* (2013.01); *G06T 2207/30252* (2013.01)

(58) Field of Classification Search
None
See application file for complete search history.

(56) References Cited

U.S. PATENT DOCUMENTS

| | | |
|---|---|---|
| 9,527,528 B1 | 12/2016 | Harrison |
| 11,273,868 B2 | 3/2022 | Gali |
| 2009/0022369 A1 | 1/2009 | Satoh et al. |
| 2010/0083514 A1 | 4/2010 | Williams |
| 2010/0171828 A1 | 7/2010 | Ishii |
| 2014/0200759 A1* | 7/2014 | Lu .............................. G06T 7/73 |
| | | 701/28 |
| 2014/0303847 A1 | 10/2014 | Lavoie |
| 2015/0203128 A1 | 7/2015 | Strano |

(Continued)

FOREIGN PATENT DOCUMENTS

| | | |
|---|---|---|
| CN | 101116101 A | 1/2008 |
| CN | 105270408 A | 1/2016 |

(Continued)

OTHER PUBLICATIONS

Christian et al (Advanced 3-D trailer pose estimation for Articulated vehicles, Published on Jun. 28-Jul. 1, 2015, IEEE) (Year: 2015).*

(Continued)

*Primary Examiner* — Ian L Lemieux
(74) *Attorney, Agent, or Firm* — Fitch, Even, Tabin & Flannery LLP

(57) ABSTRACT
The present disclosure relates to a method for determining the yaw angle of a trailer with respect to the longitudinal axis of a towing vehicle based on at least one feature included in multiple captured images by using correction information.

17 Claims, 3 Drawing Sheets

(56) References Cited

U.S. PATENT DOCUMENTS

| | | | | |
|---|---|---|---|---|
| 2015/0217693 | A1* | 8/2015 | Pliefke | H04N 7/183 |
| | | | | 348/118 |
| 2015/0286878 | A1 | 10/2015 | Molin | |
| 2015/0302587 | A1 | 10/2015 | Hirano et al. | |
| 2016/0023525 | A1 | 1/2016 | Lavoie | |
| 2016/0048966 | A1 | 2/2016 | Kuehnle | |
| 2016/0049020 | A1 | 2/2016 | Kuehnle | |
| 2016/0229451 | A1 | 8/2016 | Raad | |
| 2016/0264046 | A1 | 9/2016 | Bochenek | |
| 2016/0280258 | A1 | 9/2016 | Lavoie | |
| 2016/0362135 | A1 | 12/2016 | Xu | |
| 2017/0174023 | A1 | 6/2017 | Hu | |
| 2017/0341583 | A1 | 11/2017 | Zhang | |
| 2018/0001928 | A1 | 1/2018 | Lavoie | |
| 2018/0181142 | A1 | 6/2018 | Baran | |
| 2018/0202804 | A1 | 7/2018 | Dumble | |
| 2018/0251154 | A1 | 9/2018 | Lu et al. | |
| 2018/0253608 | A1 | 9/2018 | Diessner | |
| 2018/0253609 | A1 | 9/2018 | Potter | |
| 2018/0276839 | A1 | 9/2018 | Diessner | |
| 2018/0299885 | A1 | 10/2018 | Herzog | |
| 2018/0365509 | A1 | 12/2018 | Naserian | |
| 2019/0009815 | A1 | 1/2019 | Lavoie | |
| 2019/0082173 | A1 | 3/2019 | Schilling | |
| 2019/0118594 | A1 | 4/2019 | Loeben | |
| 2019/0335100 | A1 | 10/2019 | Chen | |
| 2019/0339704 | A1 | 11/2019 | Yu | |
| 2019/0347825 | A1* | 11/2019 | Gupta | B60D 1/245 |
| 2019/0375399 | A1 | 12/2019 | Kasaiezadeh Mahabadi | |
| 2019/0375454 | A1 | 12/2019 | Kasaiezadeh Mahabadi | |
| 2020/0055356 | A1 | 2/2020 | Niewiadomski | |
| 2020/0215992 | A1 | 7/2020 | Plowman | |
| 2020/0369320 | A1 | 11/2020 | Niewiadomski | |
| 2021/0019904 | A1 | 1/2021 | Selensky et al. | |
| 2021/0042961 | A1 | 2/2021 | Greenwood | |
| 2021/0064046 | A1 | 3/2021 | Singh | |
| 2021/0070362 | A1 | 3/2021 | Xu | |
| 2021/0129752 | A1 | 5/2021 | Raeis Hosseiny | |
| 2021/0370912 | A1 | 12/2021 | Yamamoto | |
| 2022/0222850 | A1 | 7/2022 | Turner | |
| 2023/0173998 | A1 | 6/2023 | Plowman et al. | |
| 2023/0215035 | A1 | 7/2023 | Plowman et al. | |
| 2023/0322032 | A1 | 10/2023 | Plowman | |

FOREIGN PATENT DOCUMENTS

| | | | |
|---|---|---|---|
| CN | 106796729 | A | 5/2017 |
| CN | 106796730 | A | 5/2017 |
| CN | 107433905 | A | 12/2017 |
| CN | 109094669 | A | 12/2018 |
| CN | 208282792 | | 12/2018 |
| CN | 110576862 | A | 12/2019 |
| DE | 102011113197 | A1 | 3/2013 |
| DE | 102016117284 | A1 | 3/2018 |
| DE | 102018123250 | A1 | 3/2020 |
| EP | 1852821 | B1 | 4/2013 |
| EP | 2903256 | A1 | 8/2015 |
| EP | 3537382 | A1 | 9/2019 |
| EP | 3552926 | A1 | 10/2019 |
| JP | 2002120775 | A | 4/2002 |
| JP | 2006242943 | A | 9/2006 |
| JP | 2006246951 | A | 9/2006 |
| JP | 2012098984 | A | 5/2012 |
| WO | 2014050210 | A1 | 4/2014 |
| WO | 2019166065 | A1 | 9/2019 |
| WO | 2019170469 | A1 | 9/2019 |
| WO | 2019202317 | A1 | 10/2019 |

OTHER PUBLICATIONS

A. Dahal et al., "Deep TrailerAssist: Deep Learning Based Trailer Detection, Tracking and Articulation Angle Estimation on Automotive Rear-View Camera," 2019 IEEE/CVF International Conference on Computer Vision Workshop (ICCVW), Seoul, Korea (South), 2019, pp. 2339-2346, doi: 10.1109/ICCVW.2019.00287 (Year: 2019).*

Bahramgiri, M., Nooshabadi, S., Olutomilayo, K. T., & Fuhrmann, D. R. (2022). Hitch angle estimation for trailer backup system—an object detection and tracking approach. IEEE Transactions on Instrumentation and Measurement, 71, 1-15. (Year: 2022).*

Notice of Reasons for Refusal drafted Aug. 22, 2023 for the counterpart Japanese Patent Application No. 2022-549861 and Global Dossier translation of same.

Christopher Charles De Saxe, "Vision-based trailer pose estimation for articulated vehicles", Sep. 2017.

File history for U.S. Appl. No. 17/995,120, including Non-Final office action dated Jun. 12, 2024.

European Patent Office Search Report dated Aug. 7, 2020 for the counterpart European Application No. 20167183.1.

The International Search Report and the Written Opinion of the International Searching Authority mailed on Dec. 23, 2020 for the counterpart PCT Application No. PCT/EP2020/084112.

Notice of Reasons for Refusal drafted Jan. 11, 2024 for the Japanese Patent Application No. 2022-549861 and translation of same.

File History for the cross-referenced U.S. Appl. No. 17/995,117, including US Non-Final Office Action dated Mar. 7, 2025.

Final Office Action dated Apr. 3, 2025 for the cross-referenced U.S. Appl. No. 17/995,141.

File History for the cross-referenced U.S. Appl. No. 17/995,141, including US Non-Final Office Action dated Nov. 22, 2024.

Notice of Allowance dated Oct. 9, 2024 for the cross-referenced U.S. Appl. No. 17/995,120.

U.S. Appl. No. 17/995,117; Final Office Action mailed Oct. 7, 2025; 52 pages.

U.S. Appl. No. 17/995,141; Advisory Action Before the Filing of an Appeal Brief mailed Aug. 6, 2025; 3 pages.

U.S. Appl. No. 17/995,141; Non-Final Office Action mailed Sep. 17, 2025; 23 pages.

CNIPA; Office Action dated Jul. 12, 2025, from related Chinese Patent Application No. 202080098800.5, 14 pages (with machine English translation).

CNIPA; Office Action dated Jul. 24, 2025, from related Chinese Patent Application No. 202080098812.8, 20 pages (with machine English translation).

U.S. Appl. No. 17/995,117; Advisory Action Before the Filing of an Appeal Brief mailed Nov. 10, 2025; 3 pages.

U.S. Appl. No. 17/995,141; Final Office Action mailed Jan. 6, 2026; 24 pages.

U.S. Appl. No. 17/995,117; Non-Final Office Action mailed Jan. 14, 2026; 25 pages.

* cited by examiner

METHOD AND SYSTEM FOR CALCULATING VEHICLE TRAILER ANGLE

CROSS-REFERENCE TO RELATED APPLICATIONS

The present application is a National Stage Application under 35 U.S.C. § 371 of International Patent Application No. PCT/EP2020/084112 filed on Dec. 1, 2020, and claims priority from European Patent Application No. 20167183.1 filed on Mar. 31, 2020, in the European Office, the disclosures of which are herein incorporated by reference in their entireties.

TECHNICAL FIELD

The present invention relates generally to the field of vehicle assistance systems. More specifically, the present invention relates to a method and a system for calculating yaw angle of a trailer coupled with a towing vehicle based on image information provided by a camera of the vehicle.

BACKGROUND

Methods for calculating the angle of a trailer with respect to the towing vehicle based on image information provided by a camera of the vehicle are already known.

Specifically, methods are known which provide reliable approximations of trailer yaw angle without considering the location of the pivot point of the trailer. However, the accuracy of yaw angle approximation of the methods is low, especially in case of great yaw angles.

SUMMARY

It is an objective of the embodiments of the present disclosure to provide a method for calculating yaw angle of a trailer with high robustness and high accuracy. The objective is addressed by the features of the independent claims. Embodiments are given in the dependent claims. If not explicitly indicated otherwise, embodiments of the present disclosure can be freely combined with each other.

According to an aspect, the present disclosure refers to a method for determining the yaw angle of a trailer with respect to the longitudinal axis of a towing vehicle. The towing vehicle comprises a towball. Based on the towball, the trailer can be coupled with the vehicle. The method includes the following steps.

First, at least a first and a second image of the trailer is captured using a camera. The first and second images are captured such that the orientation of the trailer with respect to the vehicle is different on the at least two images.

After capturing the images, at least a first feature of the trailer is determined. The first feature has to be visible on first and second image.

Based on the determined first feature, a first angle estimation is calculated. The first angle estimation characterizes the pivot angle in a horizontal plane between the first feature on the first image and the first feature on the second image with respect to the position of the camera of the towing vehicle. In other words, the first angle estimation refers to a pivot angle which is confined between a first line which runs between the position of the first feature on the first image and the position of the camera and a second line which runs between the position of the first feature on the second image and the position of the camera. The pivot angle opens from the vehicle towards the trailer.

In the following, the method using at least one angle estimation based on at least one feature detected on at least two images is referred to as "basic algorithm".

It is worth mentioning that the term "position of the first feature on the first/second image" refers to the 2D image coordinates of the image feature, or the corresponding optical ray (for instance, specified as a 3D unit vector, or an azimuth/elevation). A 2D image coordinate can be converted into an optical ray using the cameras calibration information.

Furthermore, one or more angle coefficients are provided. The one or more angle coefficients provide scaling information for the angle estimations. So in other words, based on the angle coefficients, the angle estimations can be modified in order to mitigate lack of accuracy.

Finally, the yaw angle of the trailer is calculated based on the first angle estimation and based on the one or more angle coefficients.

The method is advantageous because due to using two or more images and using at least one trailer feature for calculating the yaw angle, the results of yaw angle determination are very reliable and robust even when the detection of trailer features suffers from high noise or the quality of the images is poor. Due to using the one or more angle coefficients, the angle estimation can be scaled in order to improve accuracy.

According to an embodiment, at least a first and a second feature of the trailer is determined. The first feature is arranged at a different position of the trailer than the second feature. For example, the first feature may be a conspicuous first characteristic at a first location and the second feature may be a conspicuous second characteristic at a second location of the trailer. In addition, at least a second angle estimation is calculated. The second angle estimation characterizes the pivot angle in a horizontal plane between the second feature on the first image and the second feature on the second image with respect to the position of the camera of the towing vehicle. In other words, the second angle estimation refers to a pivot angle which is confined between a first line which runs between the position of the second feature on the first image and the position of the camera and a second line which runs between the position of the second feature on the second image and the position of the camera. The pivot angle opens from the vehicle towards the trailer.

By using two or more features of the trailer, results with higher reliability can be obtained because effects of noise and mismatches can be reduced.

According to an embodiment, the one or more angle coefficients are established based on geometry information. The geometry information may consider the distance between the camera and the towball and the distance between the camera and one or more features of the trailer. Thereby lack of accuracy due to unknown geometric relations between vehicle characteristics (specifically the local relation between the camera and towball) and between the vehicle and the trailer can be mitigated.

According to an embodiment, an angle coefficient is the distance between the camera and the towball divided by the distance between the camera and a feature of the trailer. The further away a feature is from the camera, the closer the coefficient will be to zero.

According to an embodiment, the one or more angle coefficients are calculated by the distance between the camera and the towball divided by the distance between the camera and one or more features of the trailer. By calculating the quotient of the distances, the accuracy of yaw angle determination can be further improved.

According to an embodiment, the angle coefficient is a single coefficient being tailored for the respective vehicle. The angle coefficient may be predetermined for the specific vehicle characteristics (specifically the local relation between the camera and towball) and is used without considering the specific trailer. So, in other words, the single coefficient may be a "one-fits-all-trailers" coefficient. Thereby, an increase of accuracy with limited computational effort can be obtained. The single coefficient may be applied to each angle estimation or to a median value or average value established based on at least two angle estimations. So, in other words, either the at least one angle estimation is directly scaled based on the angle coefficient or an average value or median value of multiple angle estimations is calculated and the average or median value is scaled by the single angle coefficient.

According to an embodiment, the angle coefficient is dynamically adapted for a respective trailer. So, in other words, the angle coefficient is not fixed as a "one-fits-all-trailers" coefficient but is dynamically adjusted depending on which trailer is currently used. Thereby the accuracy of yaw angle determination is further improved.

According to an embodiment, the dynamic adaption of angle coefficient is performed by using a reference algorithm for determining yaw angle reference information and adapting the angle coefficient by comparing the two or more angle estimations with yaw angle reference information provided by the reference algorithm. The reference algorithm may provide, at least in certain circumstances, yaw angle reference information which is more accurate than the at least one angle estimation provided by the basic algorithm and which is used to dynamically establish the one or more angle coefficients. So, in other words, the results of reference algorithm are used for scaling the angle estimations provided by the basic algorithm.

According to an embodiment, the reference algorithm is configured to perform the following steps:

a ray between the camera and the determined first feature on the first image is developed and the ray is projected onto a horizontal plane thereby obtaining a first projected feature position. Similarly, a ray between the camera and the determined first feature on the second image is developed and the ray is projected onto the horizontal plane thereby obtaining a second projected feature position.

Based on the determined first feature, a first perpendicular bisector is established between the location of the first projected feature position and the location of the second projected feature position. More in detail, the first perpendicular bisector may be a perpendicular straight line running through the center of the line connecting the location of the first projected feature position and the location of the second projected feature position.

After establishing the first perpendicular bisector, a first intersection point of the first perpendicular bisector with a reference axis or a further perpendicular bisector is established.

Finally, yaw angle reference information is provided based on a first reference angle estimation, the first reference angle estimation referring to the angle between a first line running from the first projected feature position to the first intersection point and a second line running from the second projected feature position to the first intersection point in the horizontal plane.

It is worth mentioning that the term "position of the first feature on the first image" refers to the 2D image coordinates of the image feature, or the corresponding optical ray (for instance, specified as a 3D unit vector, or an azimuth/elevation). A 2D image coordinate can be converted into an optical ray using the cameras calibration information.

The first reference angle estimation may open from the towing vehicle towards the trailer.

According to an embodiment, multiple yaw angle reference information referring to different yaw angles are developed based on the reference algorithm and the angle coefficient is determined by developing an average value of the multiple yaw angle reference information. Other statistical methods could also be used, for instance variance could be measured to remove outliers. Thereby, noise effects of the reference algorithm can be mitigated.

According to an embodiment, on the first or second image, the yaw angle of the trailer with respect to the vehicle is zero. Thereby, the image can be used as "zero-pose image", i.e., as a reference of an exact alignment of the longitudinal axis of the vehicle with the longitudinal axis of the trailer. However, also another yaw angle value can be used as reference value, as long as the other yaw angle is known.

According to an embodiment, in the basic algorithm, calculating first angle estimation includes determining optical rays between the position of camera and the first feature at the first and second images. The optical rays refer to straight lines which run between the camera position and the first feature. Based on the optical rays, the current pivot angle can be determined with reduced computational effort, e.g., based on geometrical methods.

According to an embodiment, specifically in the basic algorithm, camera calibration information is used for converting the position of the first feature into optical rays. For example, having knowledge of camera position using camera calibration information, the position of a certain feature on the image can be transferred in location information depending on or being correlated with the position of the camera.

According to an embodiment, camera calibration information is used for converting the position of the first feature from the local domain of the image into the local domain of the vehicle or of the position of the camera of the vehicle. For example, having knowledge of camera position using camera calibration information, the position of a certain feature on the image can be transferred in location information depending on or being correlated with the position of the camera included or attached to the vehicle.

According to an embodiment, in addition to the first feature, at least one further feature of the trailer is used for calculating the yaw angle. Using two or more features leads to further angle estimations which further increase the robustness and reliability of yaw angle determination.

According to an embodiment, the yaw angle is calculated by establishing the median value based on at least two angle estimations. Thereby, a very stable yaw angle determination can be obtained.

According to other embodiments, the yaw angle is calculated by establishing an average value of at least two angle estimations or by using a statistical approach applied to the angle estimations.

According to an embodiment, for providing yaw angle reference information, at least two reference angle estimations based on at least two different trailer features are established and yaw angle reference information is calculated by establishing the median value based on the at least two reference angle estimations. Thereby, a very stable determination of yaw angle reference information can be obtained.

According to other embodiments, yaw angle reference information is calculated by establishing an average value of the at least two reference angle estimations or by using a statistical approach applied to the reference angle estimations.

According to an embodiment, the method further includes the step of determining an angle window. The angle window may include an upper and a lower bound around the yaw angle. In addition, a set of features is determined, the features within the set of features leading to angle estimations which are located within the angle window. The determined set of features, preferably only features included in the set of features, is used for future yaw angle calculations. So, in other words, information of previous yaw angle determinations is used to determine two or more features of the trailer which lead to angle estimations quite close to determined yaw angle (i.e. within the angle window) and to not track those features which lead to angle estimations significantly deviating from determined yaw angle (i.e., out of the angle window). Thereby, the computational complexity and accuracy of angle estimation can be significantly reduced.

According to an embodiment, in the reference algorithm, the reference axis is the longitudinal axis of the towing vehicle if the camera and the towball of the vehicle are arranged in a vertically oriented plane which comprises the longitudinal axis of the towing vehicle.

According to another embodiment, in the reference algorithm, the reference axis is a straight line running between the camera and the towball if the camera and/or the towball have a lateral offset with respect to the longitudinal axis of the towing vehicle. Thereby, a lateral offset between the camera and the towball can be compensated.

According to an embodiment, the camera is the rear view camera of the vehicle. Based on the rear view camera, images of the trailer can be captured with reduced technical effort.

According to another embodiment, an angle coefficient may be calculated independently for each feature, on the basis of the reference algorithm for that feature, and on the basis of the basic algorithm for that feature. The coefficient is independent of trailer angle, therefore even if reference algorithm is currently not accurate, or unavailable (due to mathematical instabilities, e.g., divide by zero error at low yaw angles) the angle coefficient can still be used to scale the basic algorithm, even if the angle coefficient was calculated at a different trailer angle.

Each image feature will then produce an accurate angle estimate, by scaling the basic angle estimate by the angle coefficient. An average, median or other statistical measure can be used to output an estimated trailer yaw angle from the yaw angle estimates from each feature.

According to a further aspect, a system for determining the yaw angle of a trailer with respect to the longitudinal axis of a towing vehicle is disclosed. The system includes a camera for capturing images of the trailer and a processing entity for processing the captured images. The system is further configured to execute the steps of:

capturing at least a first and a second image of the trailer using a camera, the orientation of the trailer with respect to the vehicle being different on the at least two images;

determining at least a first feature of the trailer which is visible on the first and second images;

calculating a first angle estimation, the first angle estimation characterizing the pivot angle in a horizontal plane between the first feature on the first image and the first feature on the second image with respect to the position of the camera of the towing vehicle;

providing one or more angle coefficients, the one or more angle coefficients providing scaling information for the first angle estimation; and calculating the yaw angle based on the first angle estimation and based on the one or more angle coefficients.

Any above-mentioned feature described as an embodiment of the method is also applicable as a system feature in a system according to the present disclosure.

According to yet another embodiment, a vehicle including a system according to anyone of above-mentioned embodiments is disclosed.

The term "vehicle" as used in the present disclosure may refer to a car, truck, bus, train or any other crafts.

The term "yaw angle" as used in the present disclosure may refer to a pivot angle between the longitudinal axis of the vehicle and the longitudinal axis of the trailer.

The term "median" as used in the present disclosure may refer to a value separating a higher half from a lower half of a data sample or a probability distribution.

The term "essentially" or "approximately" as used in the invention means deviations from the exact value by +/−10%, preferably by +/−5% and/or deviations in the form of changes that are insignificant for the function and/or for the traffic laws.

BRIEF DESCRIPTION OF THE DRAWINGS

Various aspects of the invention, including its particular features and advantages, will be readily understood from the following detailed description and the accompanying drawings, in which.

DETAILED DESCRIPTION

Figure 1:
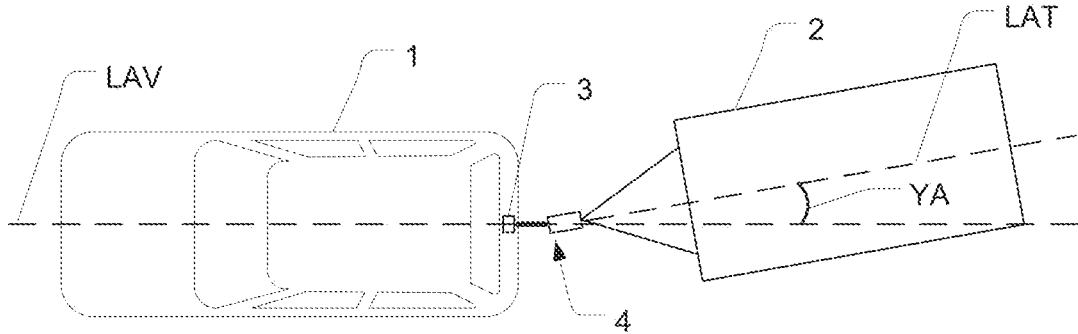
FIG. 1 shows an exemplary top view on a vehicle towing a trailer.

The present invention will now be described more fully with reference to the accompanying drawings, in which example embodiments are shown. The embodiments in the figures may relate to example embodiments, while all elements and features described in connection with embodiments may be used, as far as appropriate, in combination with any other embodiment and feature as discussed herein, in particular related to any other embodiment discussed further above. However, this invention should not be construed as limited to the embodiments set forth herein.

Throughout the following description similar reference numerals have been used to denote similar elements, parts, items or features, when applicable.

The features of the present invention disclosed in the specification, the claims, examples and/or the figures may both separately and in any combination thereof be material for realizing the invention in various forms thereof.

FIG. 1 shows a top view illustration of a vehicle 1 towing a trailer 2. The vehicle 1 comprises a longitudinal axis LAV which runs through the centre of the vehicle 1. Similarly, the trailer 2 includes a longitudinal axis LAT which runs through the center of the trailer 2. The trailer 2 is coupled with the vehicle 1 by means of a trailer hitch including a towball 4.

In certain driving situations, the longitudinal axis LAV of the vehicle 1 and the longitudinal axis LAT of the trailer 2 may not be aligned in parallel or may not fall into one another but the axes may confine a yaw angle YA. In other words, the yaw angle YA defines the angular deviation of the longitudinal axis LAT of the trailer 2 with respect to the longitudinal axis LAV of the vehicle 1. The yaw angle YA may be measured in a horizontal plane which includes the longitudinal axis LAT of the trailer 2 as well as the longitudinal axis LAV of the vehicle 1.

The knowledge of yaw angle YA is—inter alia—advantageous in trailer assistance systems, for example.

For determining the yaw angle YA, multiple images of at least a portion of the trailer 2 are captured by means of a camera 3. The camera 3 may be, for example, a rear view camera of the vehicle 1, which may also be used for capturing images of the surroundings of the vehicle 1 when driving backwards. One of the captured images may refer to a known angular arrangement of the trailer 2 with respect to the towing vehicle 1. The image may be used as reference for calculating the yaw angle YA. In the known angular arrangement of the trailer 2 with respect to the towing vehicle 1, the yaw angle YA may be 0° or any other angle value.

Figure 2:
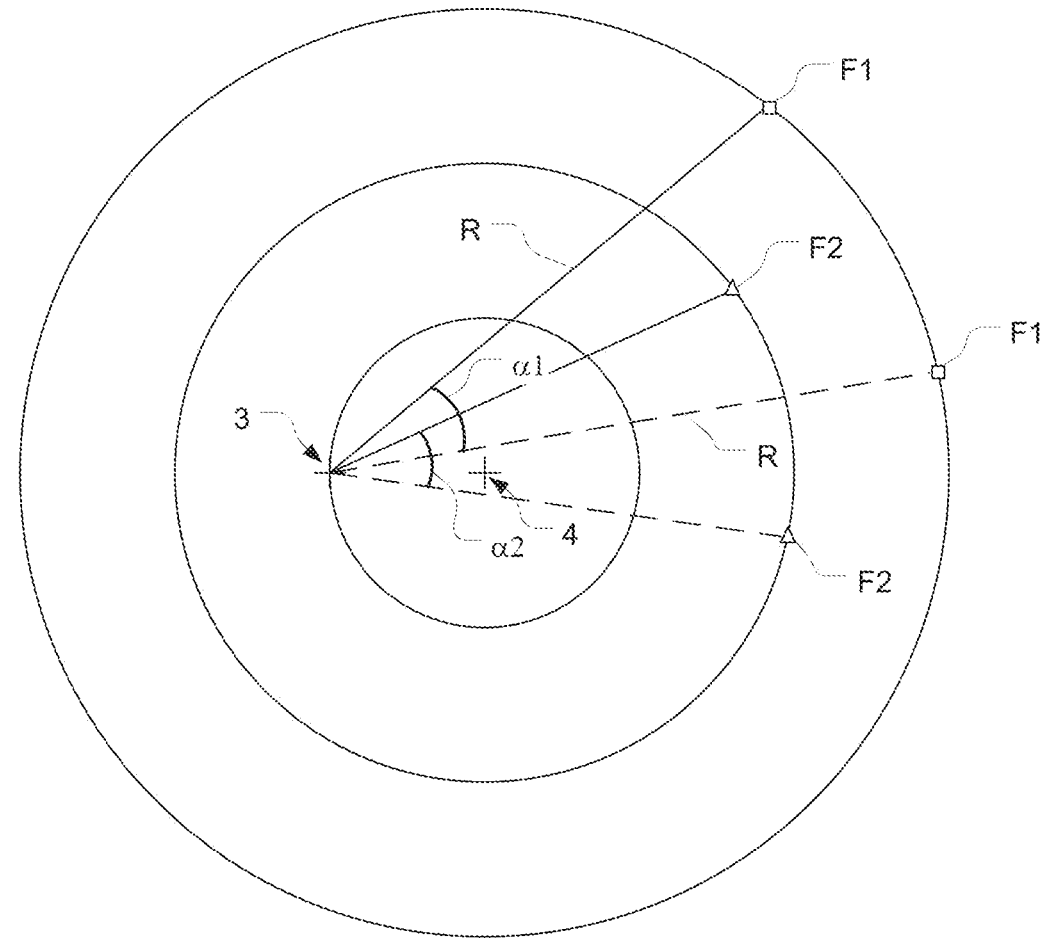
FIG. 2 schematically illustrates angle estimations based on a first and a second feature captured by camera images in different pivot angles between the trailer and the towing vehicle.

FIG. 2 shows a schematic diagram illustrating the angular relationship of a first and a second feature F1, F2 of trailer 2, the features F1, F2 being identified at different points of time and at different angular positions with respect to a fix point of the vehicle 1.

The camera 3 may capture two or more images at different points of time at which the angular position of the trailer 2 with respect to the vehicle 1 is different. For example, an image series may be captured. The image series may comprise three or more, in particular, more than five images.

In the present example, the second image may show an orientation of the trailer 2 with respect to the vehicle at a yaw angle YA=0°. However, according to other embodiments, the yaw angle YA may be any other reference yaw angle which is known in advance and which can be used for determining the current yaw angle.

On the images captured by the camera 3, multiple different features may be identifiable. In FIG. 2, features F1 and F2 are illustrated which are identified at different angular positions with respect to the position of the camera 3 of the vehicle 1 or a reference axis. The first feature F1 is illustrated by a square, the second feature F2 is illustrated by a triangle. It is worth mentioning that more than two features and more than two images can be used for yaw angle estimation. Also, usage of only one feature for estimating yaw angle is possible.

So, the upper pair of the first and second features F1, F2 (associated with the solid optical rays connecting the features F1 and F2 with the camera 3) may be identified in a first image, the lower pair of the first and second features F1, F2 (associated with dashed optical rays connecting the features F1 and F2 with the camera 3) may be identified in a second image at a different point of time.

Features on the trailer 2 may be located and matched using feature detection and matching algorithm. For example, the Harris Corner Detector, Scale-Invariant Feature Transform (SIFT) algorithm, Speeded Up Robust Features (SURF) algorithm, Binary Robust Invariant Scalable Keypoints (BRISK) algorithm, Binary Robust Independent Elementary Features (BRIEF), Oriented FAST and rotated BRIEF (ORB) algorithm or another suitable feature detection and matching algorithm could be used.

The feature detection and matching algorithm may detect image features that are on the trailer or not on the trailer. To segment the trailer features from the non-trailer features, a number of different methods could be used. For instance, when driving forwards in a straight line, trailer features can be segmented from non-trailer features by looking for features that remain in the same position over time. Alternatively, the motion of background features can be modelled over time using the vehicle's known motion. This could be extracted from CAN (Controller Area Network) data regarding speed and steering. Features which do not fit the Epipolar constraint of the Essential Matrix could then be considered as trailer features.

For determining angle estimations $\alpha 1$, $\alpha 2$, optical rays R connecting the features F1 and F2 with the camera 3 are used. In order to associate features F1 and F2 of the captured images with the position of the camera 3, calibration information of the camera 3 may be used to transform the location of features in image coordinates into the spatial domain of the camera, thereby enabling the provision of optical rays R linking the position of the respective feature F1, F2 with the camera position. In other words, for associating camera position and feature positions, the location of features on the images is transformed in the local domain of the vehicle 1, respectively, the local domain of the camera of the vehicle 1 based on calibration information of the camera 3.

After determining the optical rays R between the camera position and the one or more features in the first and second images, the pivot angles of first feature F1 and second feature F2 are determined. In FIG. 2, $\alpha 1$ illustrates the angle estimation of the pivot angle of first feature F1 between the two captured images and $\alpha 2$ illustrates the angle estimation of the pivot angle of second feature F2 between the images. According to embodiments, only one or more than two features of the trailer are determined and tracked over multiple images. In addition, more than two images are captured at different points of time in order to enhance the result of yaw angle estimation.

As mentioned before, one of the captured images may provide a reference image in which the angular position of the trailer 2 with respect to the vehicle 1 is known. In the known angular arrangement of the trailer 2 with respect to the towing vehicle 1, the yaw angle YA may be 0° or any other angle value. Therefore, based on the at least one angle estimation $\alpha 1$, $\alpha 2$, the yaw angle YA can be calculated. Again referring to FIG. 2, for example, the angular arrangement of the optical rays R indicated by dashed lines may be known because when capturing the image referring to the optical rays R, the trailer 2 has a known reference orientation with respect to the vehicle 1.

The above-mentioned method is very robust, i.e., provides angle estimations also when the image quality is poor but the accuracy of angle estimations is low. It appeared that in most cases the at least one angle estimation α1, α2 is lower than the actual yaw angle YA.

In order to improve the accuracy, the method uses one or more angle coefficients, based on which angle estimations are scaled or modified in order to provide angle estimations which are very close to actual yaw angle.

The angle coefficient may be established based on geometrical information which characterizes the geometrical situation between the vehicle 1 and the trailer 2. More in detail, the angle coefficient may be calculated based on a set of distance information, the set of distance information including the distance between the camera 3 and the towball 4 of the vehicle 1 and the distance between the camera 3 of the vehicle 1 and the at least one feature F1, F2 of the trailer 4. In particular, the angle coefficient may be calculated by a division of a first distance between the camera 3 and the towball 4 and a second distance between the camera 3 of the vehicle 1 and a certain feature F1, F2 of the trailer 2

$$\left(\text{i.e., } \frac{\text{first distance}}{\text{second distance}}\right).$$

Multiple different possibilities for using one or more angle coefficients for scaling angle estimations exist:

First, a single angle coefficient can be used for multiple features of the trailer 2. The single angle coefficient may have been established for the respective vehicle 1 in advance. The angle coefficient may take the distance of the camera 3 with respect to the towball 4 into account. The single angle coefficient can be stored in a storage device of the vehicle 1 or may be firmly implemented in the software of the vehicle 1.

After calculating two or more angle estimations α1, α2, a mean value may be calculated based on the angle estimations α1, α2. The mean value may be, for example, the median of the developed angle estimations α1, α2. According to another embodiment, the yaw angle YA may be determined by calculating the arithmetical mean of developed angle estimations α1, α2. According to yet another embodiment, the yaw angle YA may be determined by using a stochastic approach based on the angle estimations α1, α2, e.g., RANSAC-algorithm (RANSAC: random sample consensus) or least squares algorithm.

A second possibility of providing one or more angle coefficients is dynamically establishing one or more angle coefficients based on a reference algorithm. More specifically, a single angle coefficient may be established for a particular trailer 2 or multiple angle coefficients may be established, each angle coefficient being associated with a certain feature F1, F2 of the trailer 2. So, in other words, an angle coefficient can be dynamically established on a per-trailer basis or a per-feature basis.

The dynamically establishing of an angle coefficient uses angle estimations α1, α2 as mentioned before, i.e., for a certain feature, the pivot angle between a feature F1, F2 on the first image and the same feature F1, F2 on the second image is determined.

In order to determine the angle coefficient which scales a single angle estimation α1, α2 or an average or median value of multiple angle estimations α1, α2 towards the actual yaw angle YA, the single angle estimation α1, α2 or an average or median value of multiple angle estimations α1, α2 is compared with the result of a reference algorithm which provides yaw angle reference information which includes higher accuracy than the angle estimations of basic algorithm and the angle coefficient is chosen such that angle estimation is equal or essential to yaw angle reference information. Specifically, the reference method may be configured to consider the location of the towball 4 around which the trailer 2 pivots.

In the following, based on FIG. 3, an exemplary reference method is disclosed. Similar to FIG. 2, FIG. 3 shows a schematic diagram illustrating the angular relationship of a first and a second feature F1, F2 of the trailer 2 at different points of time at which the trailer 2 has a different yaw angle YA with respect to the towing vehicle 1.

It is worth mentioning that the reference algorithm uses the same images which are also used for calculating angle estimations in order to ensure that the angle coefficient is established based on the same trailer positions, respectively, trailer yaw angles.

Figure 3:
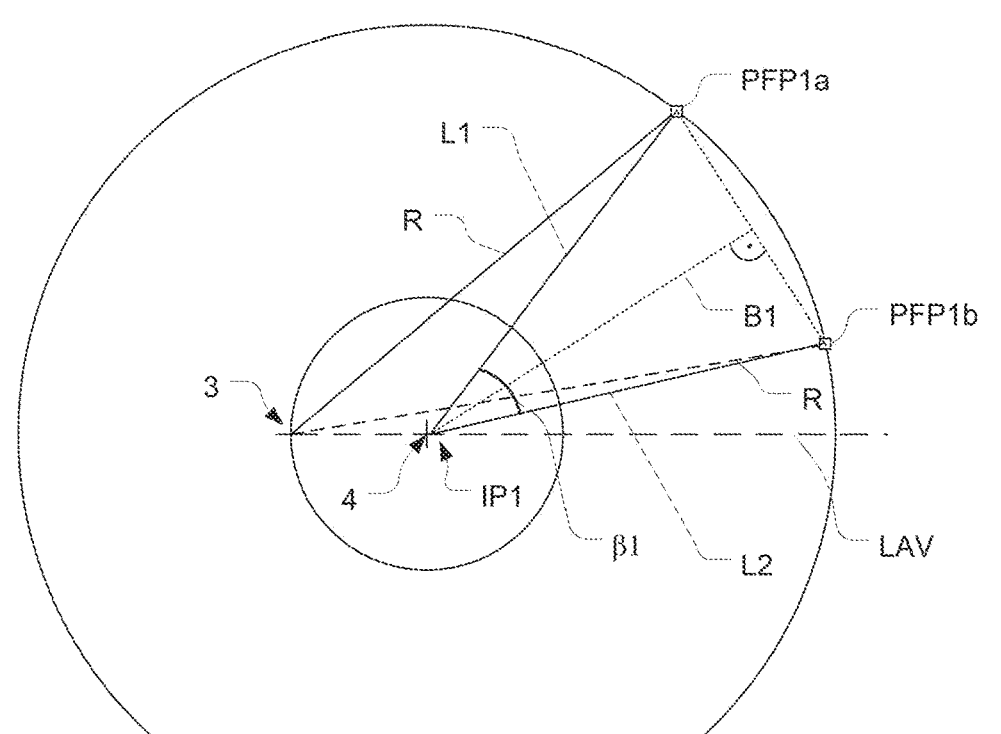
FIG. 3 schematically illustrates a reference angle estimation based on a first feature captured by camera images in different pivot angles between the trailer and the towing vehicle according to a reference algorithm.

The determination of reference yaw angle based on the reference algorithm is illustrated in FIG. 3 in closer detail. Similar to FIG. 2, in FIG. 3, a first projected feature position PFP1a which is established based on first feature F1 (associated with the solid optical ray connecting the first projected feature position PFP1a with the camera 3) is identified in a first image and a second projected feature position PFP1b which is established based on second feature F2 (associated with the solid optical ray connecting the second projected feature position PFP1b with the camera 3) is identified in a second image at a different point of time.

The determination of reference yaw angle based on the reference algorithm is illustrated in FIG. 3 in closer detail. The change of location of first and second projected feature position PFP1a, PFP1b between the first and second image is used for determining at least one reference angle estimations β1.

After feature identification in the respective images, the first feature F1 of first and second image is projected in a common horizontal plane. More in detail, the ray between the camera 3 and the determined first feature F1 on the first image is projected onto a horizontal plane thereby obtaining a first projected feature position PFP1a. In addition, the ray between the camera 3 and the determined first feature F1 on the second image is projected onto the same horizontal plane thereby obtaining a second projected feature position PFP1b. It is worth mentioning that the projection is made in the vertical direction thereby only changing the elevation angle of optical rays but not the azimuth angle.

After determining first and second projected feature positions PFP1a, PFP1b, a first perpendicular bisector B1 is established based on the first and second projected feature positions PFP1a, PFP1b. As shown in FIG. 3, the first perpendicular bisector B1 is a line being perpendicular to the line linking first and second projected feature positions PFP1a, PFP1b. In addition, the first perpendicular bisector B1 runs through the center of the linking line. The first perpendicular bisector B1 crosses a reference axis, which is in the present embodiment the longitudinal axis of the vehicle LAV. The intersection (indicated by IP1) of first perpendicular bisector B1 and reference axis provides the point of rotation, around which the trailer is rotated. More in detail, the intersection provides the position of the towball 4.

Based on the first perpendicular bisector B1, a first reference angle estimation β1 is calculated. The first reference angle estimation β1 refers to an angle provided between a first line L1 linking first projected feature position PFP1a and the intersection of first perpendicular bisector B1 and reference axis and a second line L2 linking second projected feature position PFP1b and the intersection of first perpendicular bisector B1 and reference axis. The intersection may be indicative for the position of towball 4. More in detail, the first reference angle estimation β1 characterizes the pivot angle of the trailer 2 in a horizontal plane between the location of the first feature F1 in the first image projected on the horizontal plane and the location of the first feature F1 in the second image projected on the horizontal plane around the first intersection point IP1 (which is the position of towball 4).

The first reference angle estimation β1 is representative for the yaw angle YA of the trailer 2 around its actual point of rotation.

Figure 4:
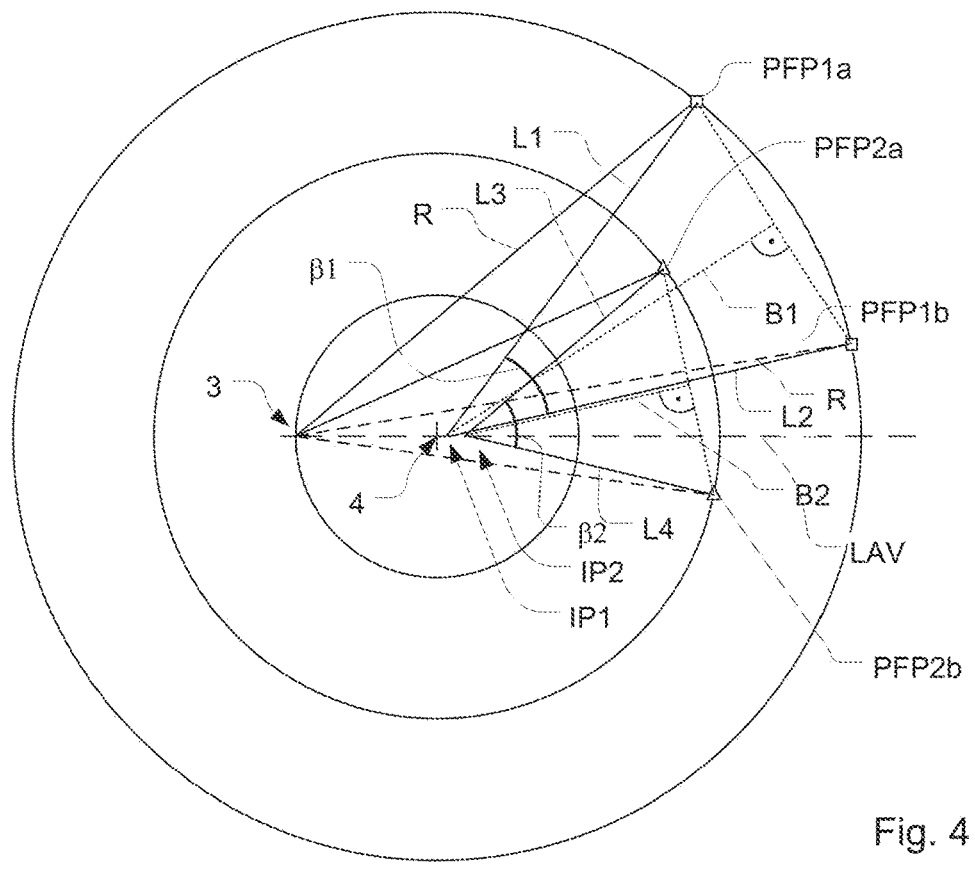
FIG. 4 schematically illustrates reference angle estimations based on a first and a second feature captured by camera images in different pivot angles between the trailer and the towing vehicle according to the reference algorithm.

FIG. 4 illustrates an embodiment similar to FIG. 3 which uses a first and a second feature F1, F2 of the trailer 2 captured at different points of time (at which the trailer 2 has a different yaw angle YA with respect to the towing vehicle 1) for establishing yaw angle reference information. The feature arrangement is similar to the illustration of FIG. 2.

On the images captured by the camera 3, multiple different features may be identifiable. As shown in FIG. 4, the features are identified at different angular positions with respect to the position of the camera 3 of the vehicle 1. The first feature is illustrated by a square, the second feature is illustrated by a triangle.

In FIG. 4, the upper pair of the first and second features (indicated by PFP1a, PFP2a and associated with the solid optical rays connecting the features with the camera 3) are identified in a first image, the lower pair of first and second features F1, F2 (indicated by PFP1b, PFP2b and associated with dashed optical rays connecting the features with the camera 3) are identified in a second image at a different point of time.

The determination of yaw angle reference information is performed analogously to the embodiment of FIG. 3. The main difference is that two reference angle estimations β1, β2 are established and yaw angle reference information is developed based on the two reference angle estimations β1, β2. More in detail, establishing first perpendicular bisector B1 and obtaining first reference angle estimation β1 is performed like described above in connection with FIG. 3.

In addition, second reference angle estimation β2 is obtained by establishing third projected feature position PFP2a and fourth projected feature position PFP2b, establishing a second perpendicular bisector B2 in order to obtain a second intersection point IP2 and connecting the third projected feature position PFP2a and the fourth projected feature position PFP2b with the second intersection point IP2. The third projected feature position PFP2a is obtained by projecting second feature F2 in the first image onto the horizontal plane and fourth projected feature position PFP2b is obtained by projecting second feature F2 in the second image onto the horizontal plane. The second intersection point IP2 may be the point in which the second perpendicular bisector B2 crosses the reference axis, in the present embodiment the longitudinal axis of the vehicle LAV. The second reference angle estimation β2 is the angle between a first line linking third projected feature position PFP2a and intersection point IP2 and a second line linking fourth projected feature position PFP2b and intersection point IP2.

In the present embodiment, the reference axis is the longitudinal axis LAV of the towing vehicle 1, because the camera 3 as well as the towball 4 is located on the longitudinal axis LAV of the vehicle 1. In other embodiments, if the camera 3 or the towball 4 has a lateral offset to the longitudinal axis LAV of the vehicle 1 or the lateral offset of the camera 3 and the towball 4 with respect to the longitudinal axis LAV of the vehicle 1 is different, the reference axis may be formed by a straight line linking the camera 3 and the towball 4.

Under ideal conditions, the first reference angle estimation β1 and the second reference angle estimation β2 should be equal (β1=β2) and should represent the yaw angle YA. However, due to noise and mismatches, the values of first and second reference angle estimation β1, β2 can be different.

It is worth mentioning that more than two features of the trailer 2 could be determined and tracked over multiple images. In addition, preferably, more than two images are captured at different points of time in order to enhance the result of estimation of yaw angle reference information. Thereby, more than two reference angle estimations β1, β2 can be established for increasing the quality of yaw angle reference information determination.

For determining yaw angle reference information based on first and second reference angle estimations β1, β2 having different values, a statistical measure may be used. According to a first embodiment, the median of two or more reference angle estimations β1, β2 may be used to determine yaw angle reference information. According to other embodiments, a statistical method may be used to determine yaw angle reference information based on of two or more reference angle estimations β1, β2. The statistical method may be, for example, a RANSAC-algorithm or least squares algorithm.

It is worth mentioning that the above-mentioned reference algorithm is a mere example of a method which can be used for scaling/adapting the angle coefficient. However, also other reference algorithms may be used for scaling/adapting the angle coefficient.

Based on the at least one reference angle estimation β1, β2, a yaw angle reference information may be developed based on which the value of angle coefficient can be selected such that the angle estimations α1, α2 are tuned towards the yaw angle reference information.

In order to remove noise which might be inherent to the above-disclosed reference method, multiple reference angle coefficients may be developed for different yaw angles of the trailer 2. The reference angle coefficient may be not dependent on the value of the yaw angle. So, by averaging multiple angle coefficients, e.g., by moving or exponential average, the noise impact can be mitigated.

As a third example, multiple angle coefficients can be established, wherein each angle coefficient corresponds to a certain feature F1, F2 of the trailer 2. So, in other words, not only a single angle coefficient is used for all features F1, F2 of the trailer but a first angle coefficient may be used for the first feature F1 and a second angle coefficient may be used for the second feature F2.

The multiple angle coefficients could be established dynamically by using the above-mentioned reference algorithm.

According to an example, the following formula may be used for determining yaw angle YA based on angle estimation α1, α2 and angle coefficient:

$$YA = \text{angle estimation} + \sin^{-1}(\text{angle coefficient} * \sin(\text{angle estimation}))$$

The above-mentioned equation can be rearranged to determine the angle coefficient by using the angle estimation α1 and reference angle estimation β1, respectively yaw angle reference information obtained based on reference angle estimation β1.

If reference angle estimation β1, respectively yaw angle reference information is unavailable, for instance due to noisy feature matches, the angle estimation α1, which is robust to noisy feature matches can be used to produce an accurate angle estimate using the previously calculated angle coefficient.

It is worth mentioning that the above-mentioned formula is a mere example and the present disclosure is not limited to the usage of the formula. So, also other formulas may be used for calculating yaw angle YA based on angle estimations α1, α2 and the angle coefficient.

Under ideal conditions, when establishing multiple angle estimations α1, α2, the first angle estimation α1 and the second angle estimation α2 should be equal (α1=α2). However, due to noise and mismatches, the values of first and second angle estimation α1, α2 can be different. It is worth mentioning that more than two angle estimations can be established for increasing the quality of yaw angle determination.

For determining the yaw angle YA based on first and second angle estimations α1, α2 having different values, a statistical measure may be used. According to a first embodiment, the median of two or more angle estimations α1, α2 may be used to determine the yaw angle YA. According to other embodiments, a statistical method may be used to determine the yaw angle YA based on of two or more angle estimations α1, α2. The statistical method may be, for example, a RANSAC-algorithm or least squares algorithm.

It appeared that not all features visible on the captured images are equally suitable for calculating yaw angle YA. In order to reduce computational complexity and robustness, those features are selected and further used for determining yaw angle YA, which provide pivot angles quite close to actual yaw angle. For feature selection, only those features may be tracked in future images which provided pivot angles α1, α2 in a certain window around the actual yaw angle. For example, the window may be defined by an upper and a lower boundary, the upper and lower boundary defining an angular window around the actual yaw angle. For example, the window may span over a distance of 2° to 10°, and more particularly between 3° and 5°. All features which led to pivot angles within the window in the last two or more yaw angle determination steps are further tracked in the next captured images.

In case of tracking a particular trailer feature for multiple images, due to the movement of the trailer 2, the samples of the feature may be arranged on a circle segment. The center of the circle segment represents the location of towball 4. Therefore, by tracking a particular trailer feature over multiple images, the location of towball 4 can be derived.

In order to mitigate noise, the determination of the location of towball 4 may consider multiple trailer features tracked for a period of time over multiple images. Each trailer feature may correspond to a circle segment with a certain center estimation. By applying a statistical method on the multiple center estimations, the actual location of towball 4 can be developed. The statistical method may be, for example, a RANSAC-algorithm or least squares algorithm.

Figure 5:
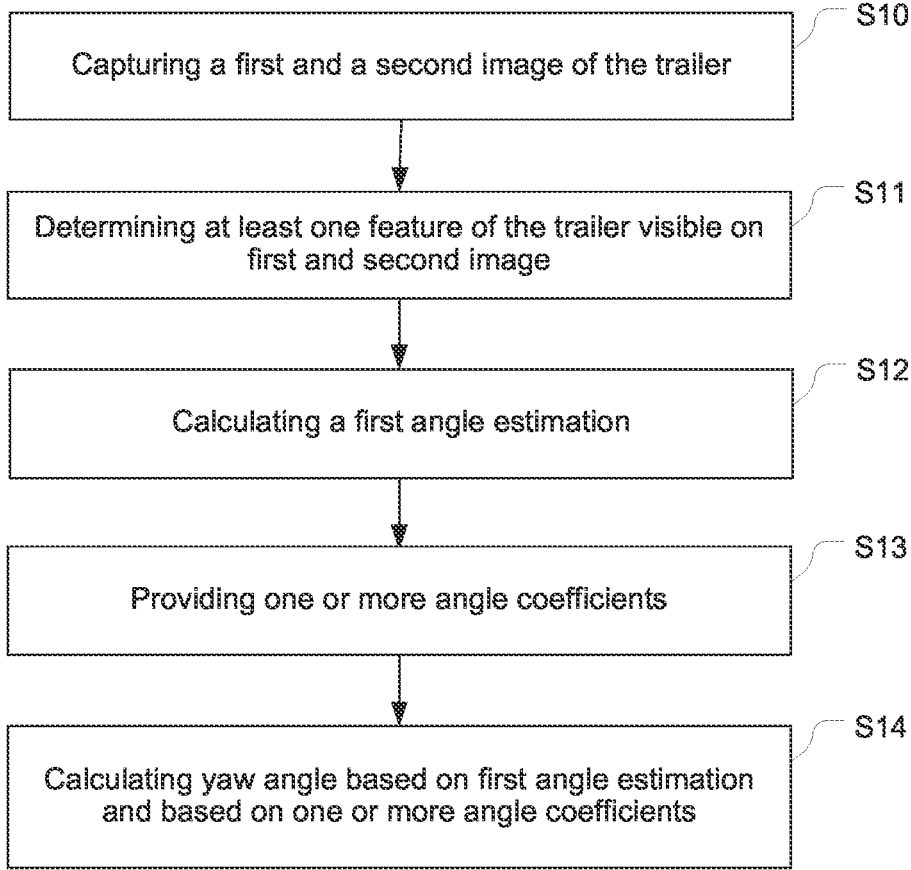
FIG. 5 shows a schematic block diagram illustrating the steps of a method for determining the yaw angle of a trailer with respect to the longitudinal axis of a towing vehicle.

FIG. 5 shows a block diagram illustrating the method steps of a method for determining the yaw angle YA of a trailer 2 with respect to the longitudinal axis LAV of a towing vehicle 1.

As a first step, a first and a second image of the trailer is captured (S10).

After image capturing, at least one feature of the trailer visible on the first and the second image is determined (S11).

After determining the at least one feature, at least a first angle estimation is calculated (S12).

In addition, one or more angle coefficients may be provided (S13). The one or more angle coefficients provide scaling information for the at least one angle estimation.

Finally, the yaw angle is calculated based on first angle estimation and based on one or more angle coefficients which provide correction information for the angle estimation (S14).

It should be noted that the description and drawings merely illustrate the principles of the proposed invention. Those skilled in the art will be able to implement various arrangements that, although not explicitly described or shown herein, embody the principles of the invention.

LIST OF REFERENCE NUMERALS 1 vehicle
2 trailer
3 camera
4 towball
α1 first angle estimation
α2 second angle estimation
β1 first reference angle estimation
β2 second reference angle estimation
B1 first perpendicular bisector
B2 second perpendicular bisector
PFP1a projected feature position of first feature in first image
PFP1b projected feature position of first feature in second image
PFP2a projected feature position of second feature in first image
PFP2b projected feature position of second feature in second image
F1 first feature
F2 second feature
IP1 first intersection point
IP2 second intersection point
LAT longitudinal axis of trailer
LAV longitudinal axis of vehicle
R optical ray
YA yaw angle

The invention claimed is:

1. A method for determining the yaw angle of a trailer with respect to a longitudinal axis of a towing vehicle comprising a towball, the method comprising:

operating a trailer assist system with the trailer and the towing vehicle, aligning a camera along the longitudinal axis, and arranging the camera so as to point backwards towards the trailer so as to include at least some of the trailer in a field of view of the camera;

by the camera, obtaining multiple images that include at least some portion of the trailer, capturing the images including at least a first and a second image of the trailer using a camera of the towing vehicle, an orientation of the trailer with respect to the vehicle being different on the at least two images;

determining at least a first feature of the trailer which is visible on the first and second images;

calculating a first angle estimation, the first angle estimation characterizing a pivot angle in a horizontal plane between the first feature on the first image and the first feature on the second image with respect to a position of the camera of the towing vehicle;

providing one or more angle coefficients, the one or more angle coefficients providing scaling information for the first angle estimation;

calculating the yaw angle based on the first angle estimation and based on the one or more angle coefficients by scaling the first angle estimation by the one or more angle coefficients; and using the calculated yaw angle by the trailer assist system in a trailer assist operation of the towing vehicle;

wherein the one or more angle coefficients are established by a distance between the camera and a towball of the towing vehicle divided by a distance between the camera and one or more features, including the first feature, of the trailer.

2. The method according to claim 1, wherein the one or more angle coefficients is a single coefficient being tailored for the towing vehicle.

3. The method according to claim 2, wherein the single coefficient is applied to the first angle estimation or to a median value or average value established based on at least two angle estimations including the first angle estimation.

4. The method according to claim 1, wherein the one or more angle coefficients is dynamically adapted for the trailer.

5. The method according to claim 4, wherein the dynamic adaption of the one or more angle coefficients is performed by using a reference algorithm for determining the yaw angle and adapting the one or more angle coefficients by comparing at least one angle estimation, including the first angle estimate, with yaw angle reference information provided by the reference algorithm.

6. The method according to claim 5, wherein the reference algorithm is configured forte:

projecting a ray between the camera and the first feature on the first image onto a horizontal plane thereby obtaining a first projected feature position and projecting a ray between the camera and the first feature on the second image onto the horizontal plane thereby obtaining a second projected feature position;

establishing a first perpendicular bisector between a location of the first projected feature position and a location of the second projected feature position;

determining a first intersection point of the first perpendicular bisector with a reference axis or a further perpendicular bisector; and providing yaw angle reference information based on a first reference angle estimation, the first reference angle estimation referring to an angle between a first line running from the first projected feature position to the first intersection point and a second line running from the second projected feature position to the first intersection point in the horizontal plane.

7. The method according to claim 5, wherein multiple yaw angle reference information referring to different yaw angles are developed based on the reference algorithm and the one or more angle coefficients is determined by developing an average value of the multiple yaw angle reference information.

8. The method according to claim 1, wherein, the one or more features comprises a plurality of features, for each feature, an angle coefficient is provided or established that is different from the angle coefficient that is provided or established for other of the plurality of features.

9. The method according to claim 8, wherein each angle coefficient is established by considering a relationship of a distance between the camera and the towball and a distance between the camera and a feature of the trailer which corresponds to the angle coefficient.

10. The method according to claim 1, wherein calculating the first angle estimation comprises determining optical rays between a position of the camera and the at least one feature at the first and second images.

11. The method according to claim 10, wherein camera calibration information is used for converting the position of the at least one feature from a local domain of the image into a local domain of the towing vehicle in order to determine the optical rays.

12. The method according to claim 1, wherein in addition to the first feature, one or more further features of the trailer are used for calculating the yaw angle.

13. A system for determining the yaw angle of a trailer with respect to a longitudinal axis of a towing vehicle, the system comprising a camera for capturing images of the trailer, the system further being configured to execute a method comprising:

operating a trailer assist system with the trailer and the towing vehicle, aligning a camera along the longitudinal axis, and arranging the camera so as to point backwards towards the trailer so as to include at least some of the trailer in a field of view of the camera;

by the camera, obtaining multiple images that include at least some portion of the trailer, capturing the images including at least a first and a second image of the trailer using a camera, an orientation of the trailer with respect to the towing vehicle being different on the at least two images;

determining at least a first feature of the trailer which is visible on the first and second images;

calculating a first angle estimation, the first angle estimation characterizing a pivot angle in a horizontal plane between the first feature on the first image and the first feature on the second image with respect to a position of the camera of the towing vehicle;

providing one or more angle coefficients, the one or more angle coefficients providing scaling information for the first angle estimation;

calculating the yaw angle based on the first angle estimation and based on the one or more angle coefficients;

using the calculated yaw angle by the trailer assist system in a trailer assist operation of the towing vehicle;

wherein the one or more angle coefficients are established by a distance between the camera and a towball of the towing vehicle divided by a distance between the camera and one or more features, including the first feature, of the trailer.

14. The system according to claim 13, wherein the one or more angle coefficients is dynamically adapted for the trailer.

15. The system according to claim 14, wherein the dynamic adaption of the one or more angle coefficients is performed by using a reference process for determining the yaw angle and adapting the one or more angle coefficients by comparing at least one angle estimation, including the first angle estimate, with yaw angle reference information provided by the reference process.

16. The system according to claim 15, wherein the reference process comprises:

projecting a ray between the camera and the first feature on the first image onto a horizontal plane thereby obtaining a first projected feature position and projecting a ray between the camera and the first feature on the second image onto the horizontal plane thereby obtaining a second projected feature position;

establishing a first perpendicular bisector between a location of the first projected feature position and a location of the second projected feature position;

determining a first intersection point of the first perpendicular bisector with a reference axis or a further perpendicular bisector; and providing yaw angle reference information based on a first reference angle estimation, the first reference angle estimation referring to an angle between a first line running from the first projected feature position to the first intersection point and a second line running from the second projected feature position to the first intersection point in the horizontal plane.

17. The system according to claim 15, wherein multiple yaw angle reference information referring to different yaw angles are developed based on the reference process and the one or more angle coefficients is determined by developing an average value of the multiple yaw angle reference information.

\* \* \* \* \*